Figure 1A:
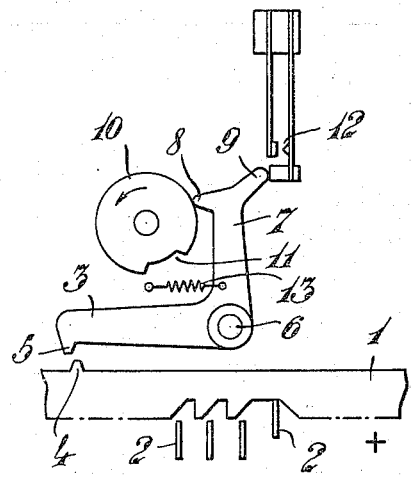

Feb. 12, 1946.     B. C. W. HAGELIN     2,394,765
CIPHERING AND DECIPHERING MECHANISM
Filed July 24, 1939     5 Sheets-Sheet 1
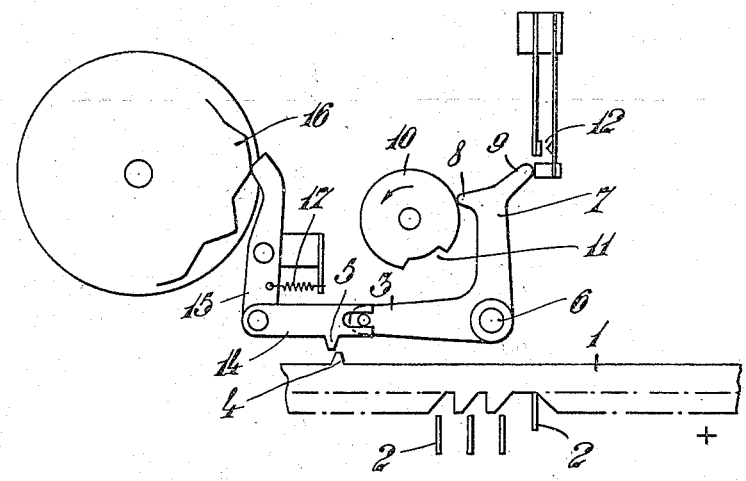
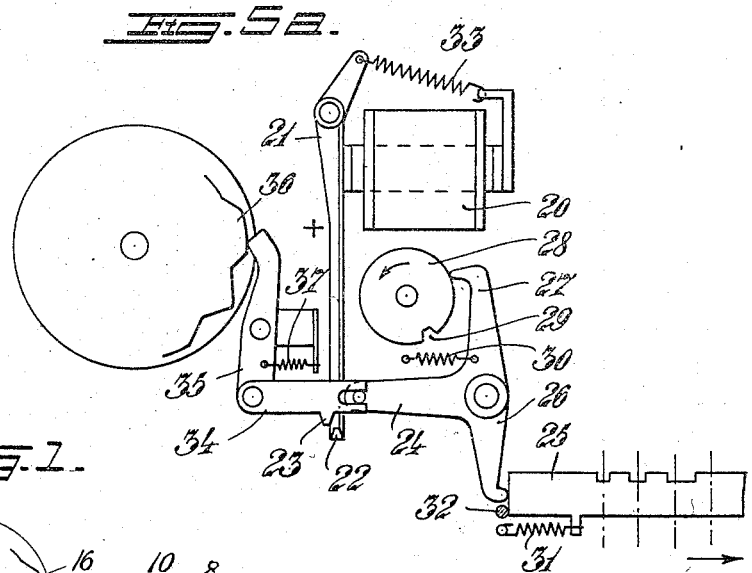
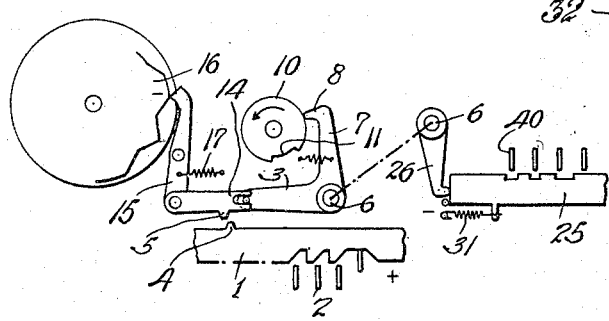
Inventor
Boris C. W. Hagelin
By Sommers & Young
Attys Feb. 12, 1946. B. C. W. HAGELIN 2,394,765
CIPHERING AND DECIPHERING MECHANISM
Filed July 24, 1939 5 Sheets-Sheet 2

Inventor
Boris C. W. Hagelin
By Sommers & Young Attys

Feb. 12, 1946. B. C. W. HAGELIN 2,394,765
CIPHERING AND DECIPHERING MECHANISM
Filed July 24, 1939  5 Sheets-Sheet 3

Inventor
Boris C. W. Hagelin.
By Sommers & Young
Attys

Feb. 12, 1946.   B. C. W. HAGELIN   2,394,765
CIPHERING AND DECIPHERING MECHANISM
Filed July 24, 1939    5 Sheets-Sheet 4

Inventor
Boris C. W. Hagelin
By Sommers & Young
Attys

Feb. 12, 1946.   B. C. W. HAGELIN   2,394,765
CIPHERING AND DECIPHERING MECHANISM
Filed July 24, 1939   5 Sheets-Sheet 5
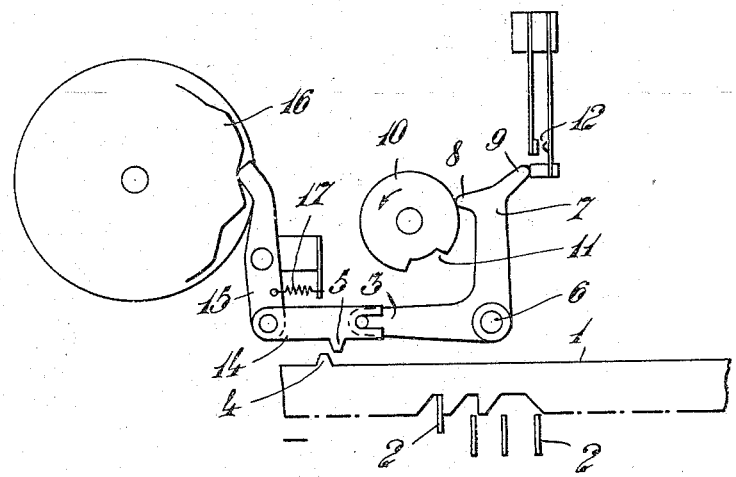
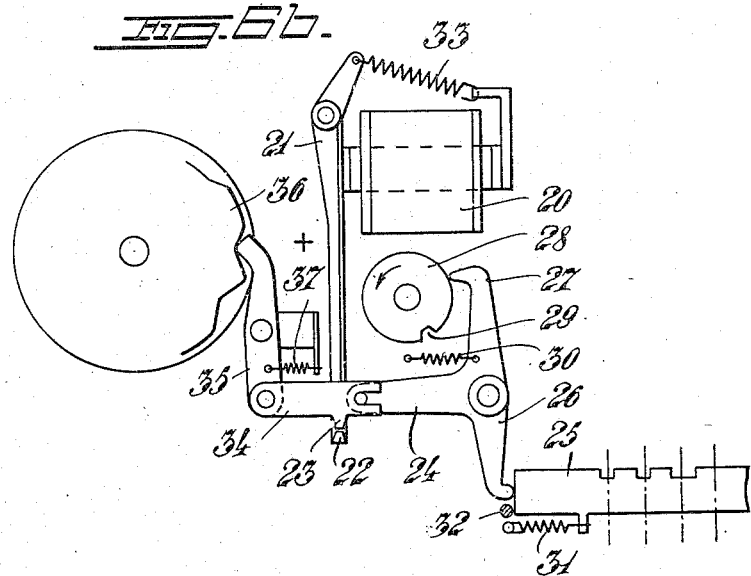
Inventor.
Boris C. W. Hagelin,
By Sommers & Young
Attys Patented Feb. 12, 1946

2,394,765

UNITED STATES PATENT OFFICE 2,394,765

CIPHERING AND DECIPHERING MECHANISM

Boris Caesar Wilhelm Hagelin, Stockholm, Sweden

Application July 24, 1939, Serial No. 286,286
In Sweden July 12, 1939

6 Claims. (Cl. 178—22)

This invention relates to ciphering and deciphering devices operating in a pure mechanical way.

The object of the invention is to provide a reliable ciphering and deciphering mechanism which is simple in construction and reliable in operation and which may be used either as an independent ciphering and deciphering machine or in combination with a telegraph apparatus or for operating a telegraphic sending machine.

A feature of the invention involves that a member which may be set to two different positions (as, for instance, an active and an inactive position) is under the conjugate control of a setting element controlled by the text to be ciphered or deciphered, that is, the primary text, and a shifting element controlled by a keying device, by the action of which said member may either be allowed to remain in the position determined by the setting element or caused to change its position, so that an active position replaces an inactive position, or vice versa.

The invention will hereinafter be described as applied to apparatus having combination bars for indicating the primary text which may be set to two definite positions and selecting bars for indicating, or recording, the secondary text which may, likewise, be set to two definite positions.

When applied to an independent ciphering and deciphering machine the invention involves the provision between each combination bar and the corresponding selecting bar, of a shifting element in the form of a connecting member adapted to occupy either of two definite positions under the control of the keying device, in one of which positions the member has no influence on the setting of the selecting bar as determined by the action of the corresponding combination bar, while when in its other position, the connecting member acts to reverse the setting of the selecting bar as determined by the combination bar.

When applied to a telegraph apparatus, having combination bars at the sender and selecting bars at the receiver, the invention involves the provision of individual connecting members (shifting elements) at the sender and the receiver, the connecting members or shifting elements of the sender being inserted between the combination bars and two impulse producing elements and the connecting members or shifting elements of the receiver being inserted between impulse controlled elements and the selecting bars. At the sender the shifting elements act to modify in a manner determined by the keying device the operation of the impulse producing elements which transmit signals in the form of positive and negative impulses (or impulses and intervals, respectively) in such a way as to leave certain impulses and intervals unchanged, as they are determined by the primary text, while replacing other impulses by intervals, and vice versa. In the receiver the shifting elements act to modify in an opposite way the operation of the impulse controlled elements serving to indicate, or record, the text.

Figure 1B:
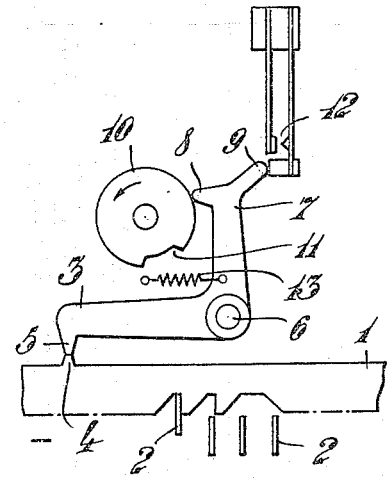
Figure 4A:
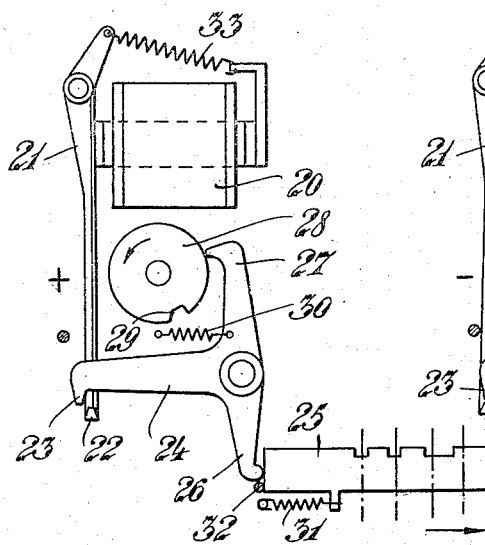
Figure 4B:
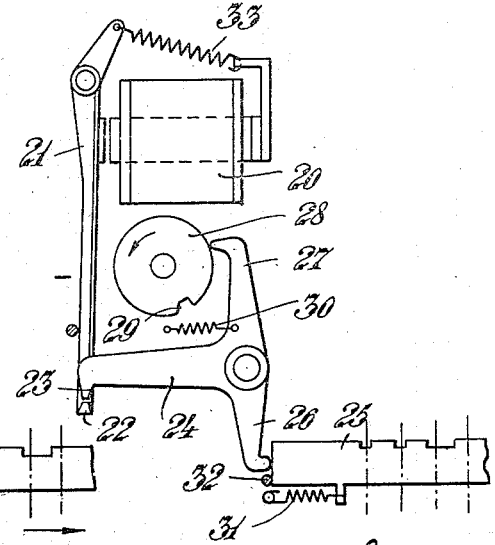
Figure 2B:
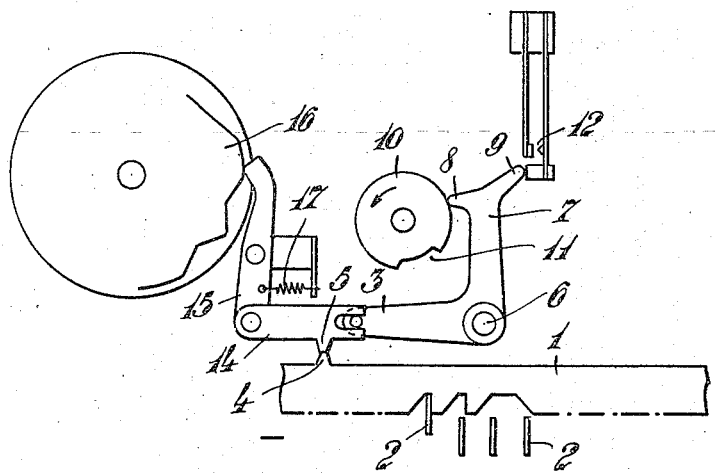
Figure 5B:
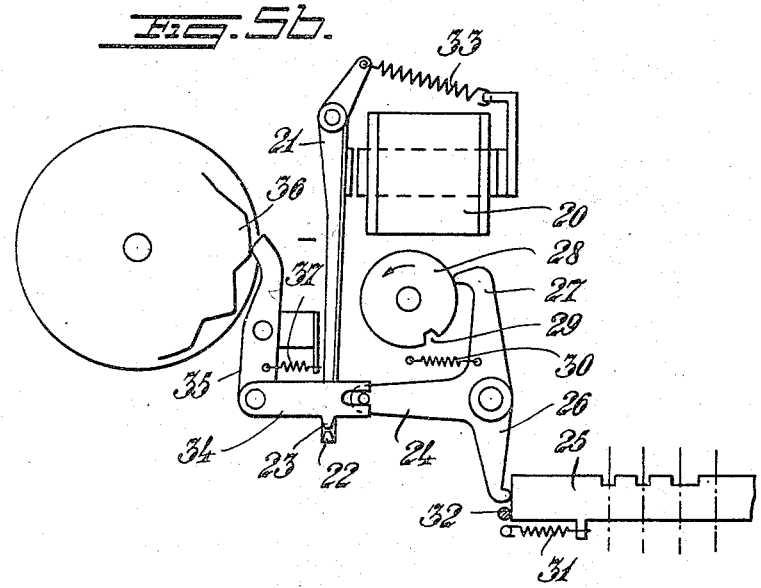
Figure 3A:
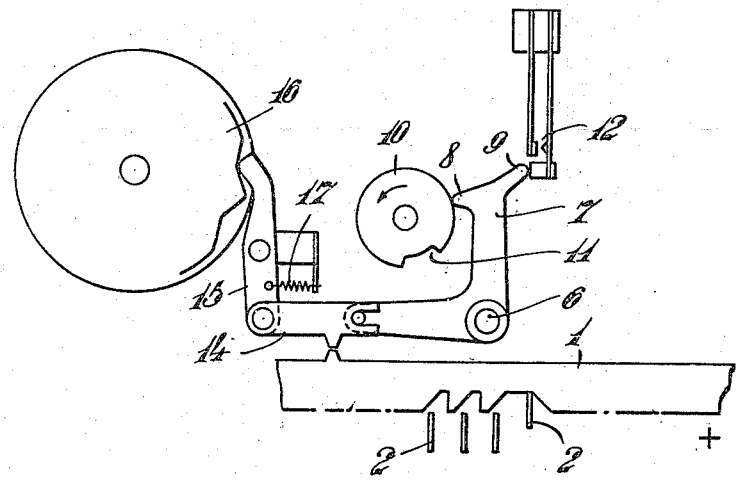
Figure 6A:
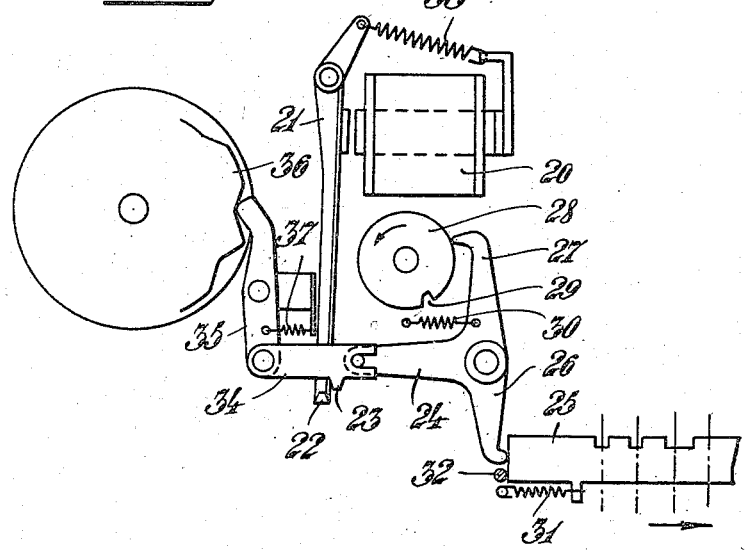

In the accompanying drawings Fig. 1 illustrates the invention as embodied in an independent ciphering and deciphering machine. In this figure those parts only of the machine are shown which are necessary for the description of the invention. In Figs. 1a–6b the invention is shown as applied to a telegraph apparatus operating on the so called five unit alphabet. Figs. 1a and 1b show, in two different positions, part of the sender of such an apparatus of a design suitable for the applying of the invention thereto. Figs. 2a and 2b show corresponding positions of the same sender with the invention applied thereto. Figs. 3a and 3b show the same sender in two further positions. Figs. 4a and 4b show two positions of part of a telegraph receiver of a design suitable for the applying of the invention thereto. Figs. 5a and 5b show corresponding positions of the receiver with the invention applied thereto. Figs. 6a and 6b show two further positions of the receiver.

In Fig. 1, the numeral 1 indicates a combination bar which may be displaced longitudinally between the definite positions, as by means of up and down moving key-operated levers 2 cooperating with vertical or oblique sides of recesses formed in the lower edge of the bar. The combination bar, of which there may be any desired number, have each an abutment 4 adapted to engage a locking tooth 5. The latter is provided on a link 14 pivotally and slidably connected at one end with one arm 3 of a bell crank lever 3, 7 pivoted at 6, the other end of said link being pivotally connected with one end of a two-armed lever 15, the other end of which is in engagement with a cam disc 16 representing a keying mechanism. A spring 17 acts to hold the lever 15 in engagement with the alternately low and high portions of the periphery of disc 16. The arm 7 of the bell crank lever 3, 7 bears with its bent end 8 against the periphery of a constantly rotating cam 10 having a recess 11 which is adapted to receive the end 8 of arm 7 one time for each revolution of the cam. The shaft 6 the centre line of which is indicated by a dotted line, also carries another lever 26 rigidly connected to the lever 3, 7 by the shaft 6. Said lever 26 engages a selecting bar 25 cooperatively with levers 40 belonging to a printing mechanism not shown.

Each time a key of the levers 2 is depressed to indicate a sign of the primary text, the combination bar shown will either remain in its previous position or be moved to its other position. In the drawings, the bar is shown as standing in its right-hand position, indicated by a plus sign. The lever 15 is in contact with a high portion of the disc 16 indicated by a minus sign, keeping the link 14 in its left-hand position. The tooth 5 being thus situated to the left of the abutment 4 allows the lever 3, 7 to swing under the action of its spring, thereby rotating the shaft, as soon as the recess 11 reaches the end 8 of lever arm 7. By the rotation of the shaft 6 the lever 26 is swung to the right, displacing the selecting bar 25 from its left-hand (—) position to its right-hand (+) position. It is thus seen that in this case the selecting bar will be set up to the same position as the combination bar. Suppose, on the contrary, that the lever 15 is in contact with a lower portion (plus portion) of the cam disc 16, while the combination bar is still in its right-hand or plus position. In such case the tooth 5 would be in its right-hand position, just above the abutment 4, thereby preventing the lever 3, 7 from swinging, as the recess 11 reaches the end 8 of lever arm 7. No turning of lever 26 and no displacement of the selecting bar 25 would result. In this case the position of the selecting bar would be the reverse of that of the combination bar.

From the above description it is evident that the following four cases are obtainable:

|  | Case | | | |
| --- | --- | --- | --- | --- |
|  | 1 | 2 | 3 | 4 |
| Combination bar | + | — | + | — |
| Keying disc | — | — | + | + |
| Selecting bar | + | — | — | + |

The ciphering and deciphering mechanism hereinbefore briefly described may be used with advantage in connection with a telegraph apparatus of the type shown in Figs. 1a and 1b and Figs. 4a and 4b, Figs. 1a and 1b showing the sender and Figs. 4a and 4b showing the receiver. Let it be assumed that the sender is provided with five combination bars and the receiver with five selecting bars. One bar only of each type is shown in the drawings as this is sufficient for the object of this description.

In Figs. 1a and 1b, the combination bar is indicated by the reference numeral 1. It is operated together with the remaining bar, not shown, by key levers 2 with associated keys, not shown. Cooperating with each combination bar is a locking arm 3. The positive connection commonly used between the combination bar and its locking arm, as for instance, by a pivot, is removed, so that the bar may be displaced without operating the locking arm. In order to permit a cooperation between the combination bar and the respective locking arm, the bar is formed with an abutment 4 and the locking arm with a tooth 5. The locking arm 3 is rigidly connected to a contact arm 7 forming together with the arm 3 a bell crank lever mounted on a shaft 6. The contact arm 7 is formed with two projections 8 and 9. The former bears upon the periphery of a cam 10 similar to the cam 10 of Fig. 1, and the latter controls an impulse producing contact 12.

The combination bar may be moved to two positions, hereinafter for the sake of simplicity referred to as the right-hand position and the left-hand position, respectively. The former is indicated by a plus sign, the latter by a minus sign. The contact arm 7 and the locking arm 3 connected thereto may, likewise, assume two positions. In one position, viz. that shown in Figs. 1a and 1b, the projection 8 is in engagement with the periphery of cam 10, while the projection 9 maintains the contact 12 open; in the other position the projection 8 is in engagement with the recess 11 of cam 10 and the projection 9 is retracted from the contact 12 allowing the same to close.

In the position of the bar 1 shown in Fig. 1a, the abutment 4 is situated to the right of tooth 5. Thus, when the recess 11 during the rotation of cam 10 reaches the projection 8, the latter can enter the recess during the action of the spring 13 connected to arm 7, allowing contact 12 to close and produce an impulse. In Fig. 1b the abutment 4 is situated just below the tooth 5, thereby preventing the swinging movement of the lever 3, 7, when the recess 11 reaches the projection 8. The contact 12 is maintained open and no impulse, but an interval, will result. It is thus seen that in the construction above described the right-hand position of bar 1 produces an impulse and the left-hand position produces an interval.

Figs. 2a and 2b and Figs. 3a and 3b show the sender above described after a device according to the invention has been applied thereto. Similar parts are indicated by the same reference numerals in Figs. 2a, 2b, 3a, 3b as in Figs. 1a and 1b. The bar 1 with its abutment 4 is unchanged, and so is the contact arm 7 with its projections 8 and 9. As to the locking arm 3 the modification has been made that the tooth 5 has been removed from the locking arm and made adjustable with relation thereto by means of a mechanical shifting device. To this end the tooth 5 is mounted on a separate arm 14 which is inserted like a link between the locking arm 3 and a two-armed lever 15 engaging a keying mechanism represented by the cam disc 16. Said arm 14 is both pivotally and slidably connected to the locking arm 3 but only pivotally connected to the lever 15. The two-armed lever 15 is acted on by a spring 17 tending to maintain the free end of the lever in contact with disc 16. The cam disc 16 is similar to that described in connection with Fig. 1, and operates in the same way as described in connection with Fig. 1. When the lever 15 is in engagement with a high portion of the cam disc 16, the tooth 5 is in its left-hand position, as shown in Figs. 2a and 2b; when the lever 15 engages a low portion of the cam disc 16, the tooth 5 is in its right-hand position, Figs. 3a and 3b.

In Fig. 2a the combination bar 1 is shown in its right-hand position, that is, the same position as in Fig. 1a. The abutment 4 is situated to the right of the tooth 5 and the contact 12 will therefore be allowed to close as the recess 11 of cam 10 reaches the projection 8, producing an impulse. In Fig. 2b the combination bar 1 is in its left-hand position. The abutment 4 being still in its left-hand position, now prevents movement of the lever 3, 7, when the recess 11 reaches the lever arm 8. The contact 12 remains open and an interval will result. It is thus seen that the conditions are similar to those of Figs. 1a and 1b.

If, on the contrary, the lever 15 is in contact with a low portion of cam disc 16 so as to keep the tooth 5 in its right-hand position, as shown in Figs. 3a and 3b, then an interval is obtained, when the combination bar is in its right-hand position, Fig. 3a, whereas an impulse is produced when the bar is in its left-hand position, Fig. 3b. In this case the conditions are opposite to those corresponding to Figs. 1a and 1b and Figs. 2a and 2b. From the description thus far given it is seen that by means of the keying mechanism (cam disc 16) and the shifting mechanism (system 5, 14, 15) the original impulse producing right-hand position of the combination bar may either be caused to produce an interval or be allowed to remain impulse-producing. Similarly, the originally interval-producing left-hand position of the combination bar may be made impulse-producing or allowed to remain interval-producing. This means, that, by the action of the keying mechanism and the shifting mechanism I may obtain in a pure mechanical way a ciphering operation in connection with the sending of a telegraphic message.

For obtaining a deciphering of the message at the receiving station, an apparatus operating on the same principle as that above set forth may be used. Figs. 4a and 4b show a receiver of a type to which the invention may be easily applied. The apparatus shown is a teletype apparatus. 20 is a magnet operated by the impulses received. The armature 21 of said magnet is formed with an extension carrying an abutment rail 22 which extends below and is common to a number of teeth 23 each carried by its individual locking lever 24 of which there is one corresponding to each of five selecting bars 25 adapted to control printing elements, not shown. One of said selecting bars only is shown in the drawings. The locking lever is formed with a downwardly extending arm 26 for cooperation with the selecting bar 25 and carries another arm 27 in engagement with a cam 28. The cam 28 is formed with a recess 29 adapted to receive the pointed end of arm 27. A spring 30 acts to maintain the arm 27 in engagement with cam 28. The selecting bar 25 is operated by a spring 31 tending to keep the left-hand end of the bar in engagement with the end of arm 26. The selecting bar may occupy two different positions, namely the left-hand position shown in the drawings which is determined by a rigid stop 32, and a right-hand position to which the selecting bar is moved against the action of the spring 31 when the pointed end of arm 27 is allowed to engage the recess 92 of cam 28.

Each time the magnet 20 is excited by an incoming impulse, it attracts its armature, causing it to move to the position shown in Fig. 4a (which is indicated by a plus sign). The abutment rail 22 due to this movement of the armature is brought to a position to the right of the teeth 23. When during the rotation of cam 28 the recess 29 reaches the end of arm 27, said end may enter the recess because of the freedom of movement of arm 24. The resulting movement of the lever 24, 26, 27 causes a displacement of the selecting bar 25 to the right, that is, to a position corresponding to that of the combination bar 1 of Fig. 1a.

When the magnet releases its armature due to an interval resulting from the position of the sender shown in Fig. 2b, the armature under the influence of spring 33 is moved to the position shown in Fig. 4b (which is indicated by a minus sign). The abutment rail 22 is now situated just below the teeth 23, thereby preventing the end of arm 27 from entering the recess 29. As no movement of the lever 24, 26, 27 takes place, the selecting bar 25 is allowed to remain in its left-hand position, corresponding to the position of the combination bar of Fig. 1b.

In applying the invention to a receiving device of the type described, the teeth 23 are removed from the lever arms 24 and are made adjustable with relation thereto. To this end I provide a separate link 34 to carry each tooth 23 and insert this link between the lever arm 24 and a two-armed lever 35 engaging a cam disc 36 under the action of a spring 37. The link 34 is pivotally and slidably connected to arm 24 but only pivotally connected to lever 35. The cam disc 36 is the same profile as the cam disc 16 of the sender. Thus, the cam disc 36 is formed with higher and lower portions serving to determine a left-hand position and a right-hand position, respectively, of the teeth 23.

In Fig. 5a the lever 35 is in engagement with a high portion of cam disc 36, determining a left-hand position of tooth 23. When the armature 21 is attracted owing to an impulse incoming to the magnet, the abutment rail 22 is moved to the right of the teeth 23, allowing the lever 24, 26, 27 to move, as soon as the end of arm 27 is reached by the recess 29 of cam 28 with resulting displacement of the selecting bar 25 to the right. The position of the selecting bar corresponds now to the position of the combination bar of Fig. 2a.

In Fig. 5b is shown how the apparatus responds to an interval. The released armature holds the abutment rail 22 in its left-hand position just below the teeth 23, so that the end of arm 27 cannot enter the recess 29 of cam 28 and the lever arm 26 cannot displace the selecting bar 25 which, therefore, remains in its left-hand position. This position corresponds to the position of the combination bar shown in Fig. 2b.

In Figs. 6a and 6b I have shown the positions of the receiver corresponding to the position of the sender shown in Figs. 3a and 3b. The lever 35 is in engagement with a low portion of cam disc 36, maintaining the tooth 23 in its right-hand position. As magnet 20 is not excited, the armature 21 is not attracted, Fig. 6a, and the abutment rail 22 is therefore held in its left-hand position by the action of spring 33. As the end of arm 27 is reached by the recess 29 of cam 28, it is allowed to enter the recess, permitting the arm 26 to displace the selecting bar 25 to the right, that is, to a position corresponding to the position of the combination bar shown in Fig. 3a.

In Fig. 6b the magnet is shown as excited by an impulse determined by the position of the sender shown in Fig. 3b. The abutment rail 22 is in its right-hand position and because the tooth 23 is also in its right-hand position, the lever 24, 26, 27 cannot swing when the recess 29 reaches the end of arm 27 and no displacement of the selecting bar can take place. Thus, the bar remains in its left-hand position corresponding to the position of the combination bar shown in Fig. 3b.

In the drawings I have shown on each separate sheet corresponding positions of the sender and the receiver.

Assuming the cam discs of the receiver occupy the same positions as those of the sender in the ciphering and deciphering operations, then the following cases are possible, the right-hand position of the combination bars and the selecting bars being indicated by a plus sign and the left-hand position of said bars being indicated by a minus sign. As to the keying discs, a minus sign is used to indicate that a high portion of the discs is operative, whereas a plus sign is used to indicate that a low portion of the cam discs is operative.

| A. Transmission | Case 1 | Case 2 |
|---|---|---|
| Position of combination bar | + (right) | − (left). |
| Operative portion of cam disc 16 | − (high) | − (high). |
| Outgoing signal | + (impulse) | − (interval). |

In these cases the position of the combination bar determines the signal transmitted.

| Reception | Case 1 | Case 2 |
|---|---|---|
| Incoming signal | + (impulse) | − (interval). |
| Operative portion of cam disc 36 | − (high) | + (low). |
| Position of selecting bar | + (right) | − (left). |

In these cases the position of the selecting bar is the same as that of the combination bar of the sender.

| B. Transmission | Case 3 | Case 4 |
|---|---|---|
| Position of combination bar | + (right) | − (left). |
| Operative portion of cam disc 16 | + (low) | + (low). |
| Outgoing signal | − (interval) | + (impulse). |

In this case a shifting operation has taken place, that is the impulse (+) normally corresponding to the right-hand position of the combination bar is replaced by an interval (−), and vice versa.

| Reception | Case 3 | Case 4 |
|---|---|---|
| Incoming signal | − (interval) | + (impulse). |
| Operated portion of cam disc 36 | + (low) | + (low). |
| Position of selecting bar | + (right) | − (left). |

In the reception a second shifting operation takes place, so that the right-hand position of the combination bar of the sender determines a right-hand position of the selecting bar of the receiver, and vice versa.

It is to be noted that in all four cases possible the receiver indicates the same position as the sender, whereas the signals transmitted between the sender and the receiver, may either remain unchanged or may be changed by replacing an impulse for an interval, and vice versa.

Hereinbefore, one unit only of the five units required in connection with an apparatus operating on the five unit alphabet, has been shown and described. The remaining four units correspond each exactly to that illustrated. In order to prevent in case of a telegraph apparatus the simultaneous transmission of impulses from two or more units of the sender or the simultaneous reception of impulses by two or more units of the receiver, the cam discs 10 and 28 and 39, respectively, are displaced with relation to each other in well-known way so as to effect the sending and the reception of impulses in succession.

The independent ciphering and deciphering mechanism does not require any displacement of the cams 10 of the various combination bars with relation to each other, as is the case in a telegraph apparatus, operating on the five unit alphabet. Thus, a single cam 10 may be common to all of the combination bars of the said independent machine. This will cause all of the selecting bars of this machine to be operated simultaneously.

In the embodiments shown the keying device is illustrated as a cam disc having rigid cams. In fact, the keying device may be of any appropriate type. In case of cam discs the higher portions thereof may consist of adjustable elements, allowing a variation of the relative position of the higher and lower portions of the cam discs.

The shifting elements which are illustrated in the drawings as links 14 and 34, with their associated teeth 5 and 23, respectively, may be replaced by other appropriate elements without departing from the principle of the invention.

What I claim is:

1. In a ciphering and deciphering mechanism having a plurality of selecting members for representing a symbol according to their combination of positions, each of said selecting members being movable individually into two different positions, namely an active and an inactive position, a plurality of setting elements, each corresponding to one of said selecting members and each adapted to be operated in conformity with a primary text, a shifting mechanism including a keying device for each setting element and selecting member, a displacing device for each selecting member, said displacing devices being moved or kept stationary under the combined control of their corresponding setting elements and shifting mechanisms so as either to allow each selecting member to remain in its position as determined by the setting element or cause it to change its position by replacing an active position for an inactive position and vice versa.

2. In a ciphering and deciphering machine having a plurality of selecting members for representing a symbol according to their combination of positions, each of said selecting members being movable into two different positions for indicating a secondary text, a plurality of setting elements each corresponding to one of said selecting members and each movable into two different positions under the control of a primary text, individual means for operating said selecting members, a keying device for each setting element and selecting member, and a connecting element between the setting elements and their operating means, said connecting element being shiftable between two different positions under the control of the setting elements and keying devices for causing said selecting members to be set into positions corresponding to that of the setting element, or to the reverse position.

3. In a ciphering and deciphering machine, a set of combination bars, individually movable into two different positions for indicating a primary text, a corresponding set of selecting bars individually movable into two different positions for indicating a secondary text, a keying device, means for individually operating the selecting bars, a connecting element between each combination bar and the respective operating means, said connecting element being shiftable between two different positions under the control of the keying device for causing an operation of the selecting bar to a position corresponding to that of the combination bar or to a position opposite to that of the combination bar.

4. In a telegraph sender, a plurality of combination bars individually movable into two different positions in conformity with a primary text, a keying device for each combination bar, impulse producing means, a plurality of connecting elements, one between each combination bar and the respective impulse producing means, said connecting element being shiftable between two different positions under the control of the keying devices for effecting a connection between the respective combination bar and impulse producing means or preventing such a connection irrespective of the position of the respective combination bar.

5. In a telegraph receiver, a plurality of selecting bars for controlling the recording of a text, means for moving said selecting bars individually into two different positions, means operable by impulses for controlling said moving means, a keying device for each selecting bar, connecting elements between said impulse controlled means and said moving means, said connecting elements being individually movable between two different positions under the control of the respective keying devices for effecting a connection between said moving means and said impulse controlled means or preventing such a connection irrespective of the position of the corresponding combination bar.

6. In a recorder, a plurality of elements, signal responsive means for exercising a predetermined control over said elements, other means for variously controlling said elements, cam operated members controlled by said elements, means for slidably articulating said elements to said cam operated members, and a plurality of instrumentalities selectively operated by said members under the control of said elements.

BORIS CAESAR WILHELM HAGELIN.